United States Patent
Lundeen et al.

[19]

[11] Patent Number: 5,890,452

[45] Date of Patent: *Apr. 6, 1999

[54] REUSABLE QUICK SIFTER

[75] Inventors: Marcee G. Lundeen, 1700 W. Loop South, Suite 1230, Houston, Tex. 77027; Daniel N. Lundeen, Houston; Milton Gaman, Galveston, both of Tex.

[73] Assignee: Marcee G. Lundeen, Houston, Tex.

[ * ] Notice: The term of this patent shall not extend beyond the expiration date of Pat. No. 5,551,376.

[21] Appl. No.: 907,828

[22] Filed: Aug. 14, 1997

Related U.S. Application Data

[63] Continuation-in-part of Ser. No. 707,051, Sep. 3, 1996, Pat. No. 5,752,466, which is a continuation-in-part of Ser. No. 522,193, Aug. 31, 1995, Pat. No. 5,551,376.

[51] Int. Cl.[6] ................................................ A01K 29/00
[52] U.S. Cl. ............................................................ 119/167
[58] Field of Search ................................... 119/165, 166, 119/167, 170

[56] References Cited

U.S. PATENT DOCUMENTS

| | | | |
|---|---|---|---|
| 2,015,119 | 9/1935 | McEwen | 150/1 |
| 2,654,527 | 9/1953 | Geckler et al. | 229/56 |
| 2,751,481 | 9/1956 | Boatwright | 150/1 |
| 3,394,870 | 7/1968 | Curtis | 229/56 |
| 3,809,013 | 5/1974 | Rigney et al. | |
| 4,217,857 | 8/1980 | Geddie | |
| 4,279,217 | 7/1981 | Behringer | 119/1 |
| 4,308,825 | 1/1982 | Stepanian | 119/1 |
| 4,312,295 | 1/1982 | Harrington | |
| 4,615,300 | 10/1986 | McDonough | 119/1 |
| 4,723,510 | 2/1988 | Skillestad | 119/1 |
| 4,784,082 | 11/1988 | Wolfe | 119/1 |
| 4,870,924 | 10/1989 | Wolfe | 119/1 |
| 4,993,845 | 2/1991 | Faltynek | 383/40 |
| 5,031,578 | 7/1991 | Hammons et al. | 119/167 |
| 5,038,721 | 8/1991 | Ouellette et al. | 119/167 |
| 5,062,392 | 11/1991 | Lavash | 119/167 |
| 5,121,712 | 6/1992 | Schulein, Jr. et al. | 119/167 |
| 5,158,042 | 10/1992 | Hammerslag et al. | 119/167 |
| 5,207,772 | 5/1993 | Lauretta et al. | 119/167 |
| 5,325,815 | 7/1994 | Gumpesberger | 119/166 |
| 5,499,610 | 3/1996 | Bruner et al. | 119/166 |
| 5,551,376 | 9/1996 | Lundeen et al. | 119/167 |

*Primary Examiner*—Michael J. Carone
*Assistant Examiner*—James S. Bergin
*Attorney, Agent, or Firm*—Daniel N. Lundeen

[57] ABSTRACT

A flexible, reusable quick sifter for use with a litter box which employs litter of the clumping type. The sifter has an expandable or stretchable netting secured to a hydrophobic surface across an opening such as a slit in a central area of the box. On lifting, clumping litter disposed in the central area spreads the netting and the slit open to allow unclumped litter to sift through the netting. The clumped litter is retained in the quick sifter and netting material for convenient disposal. The quick sifter is made from a rubberized fabric for reusability.

19 Claims, 2 Drawing Sheets

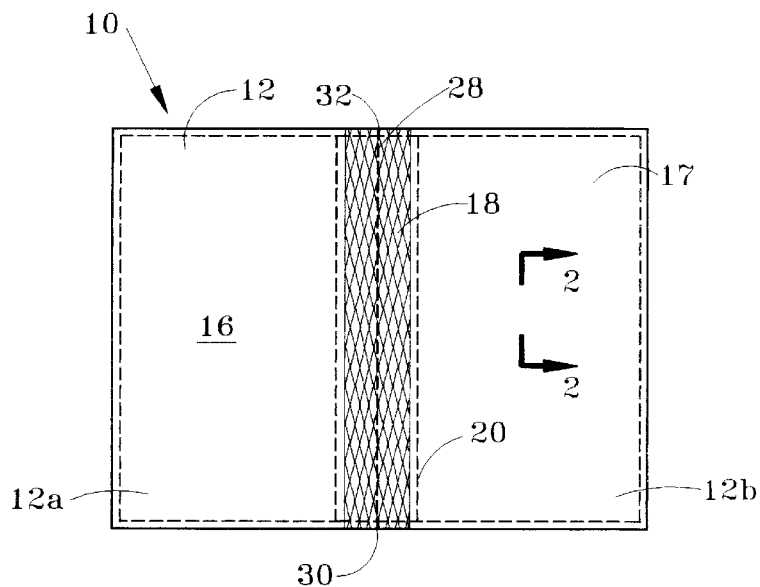
FIG. 1
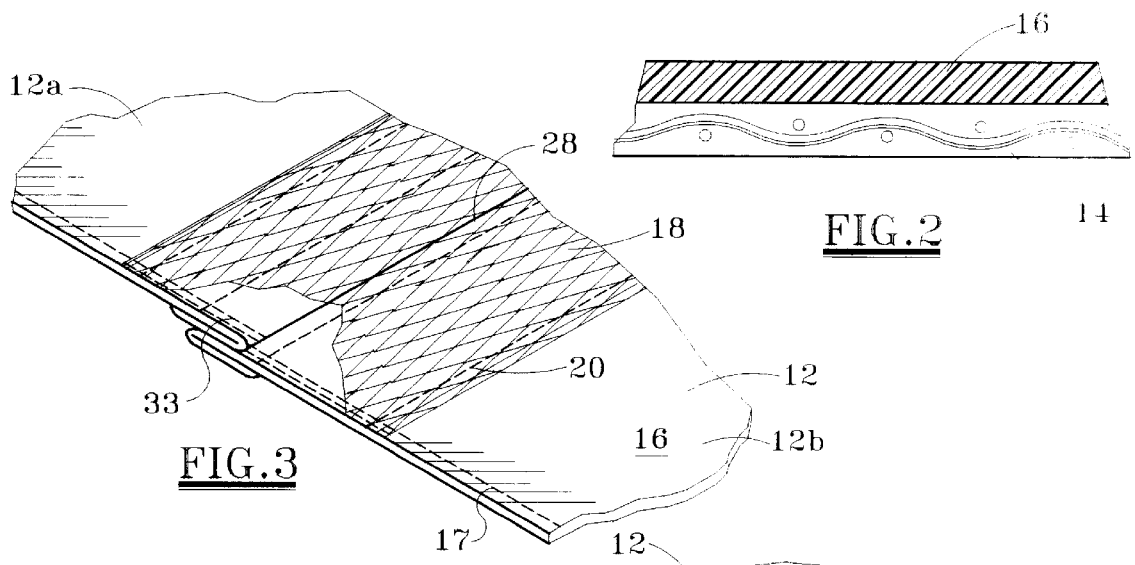
FIG. 2
FIG. 3
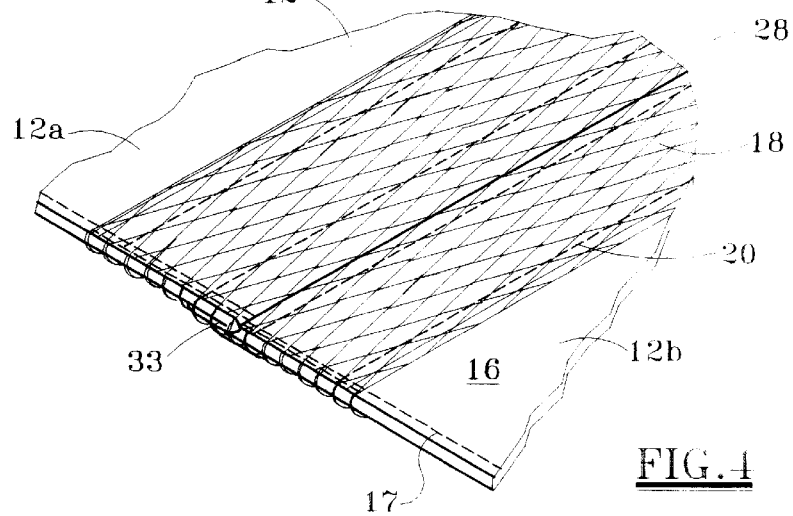
FIG. 4

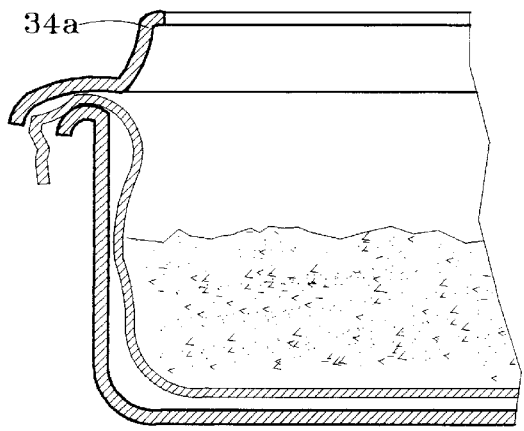
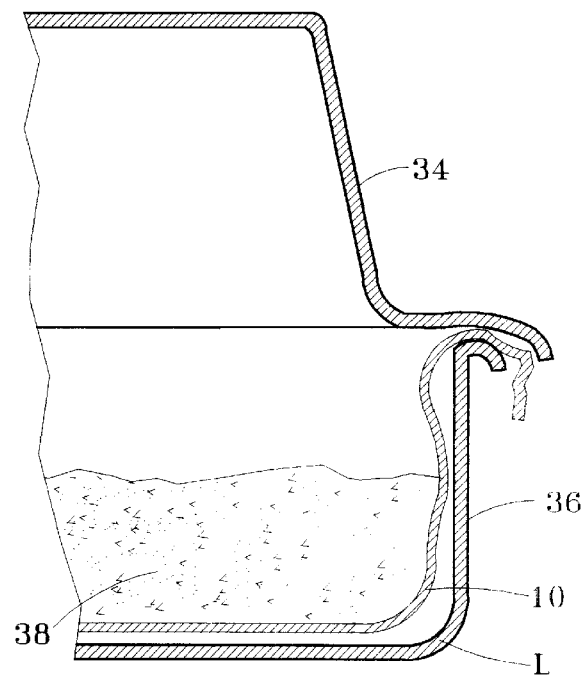
FIG.5A     FIG.5B     FIG.6
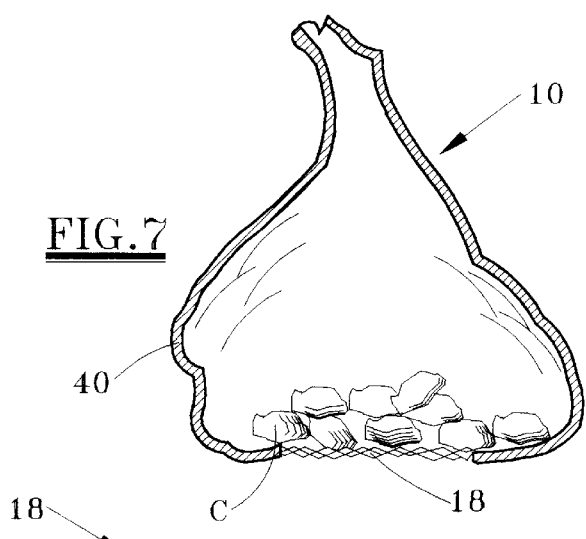
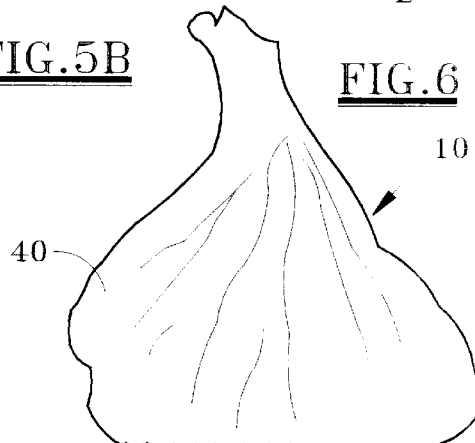
FIG.7
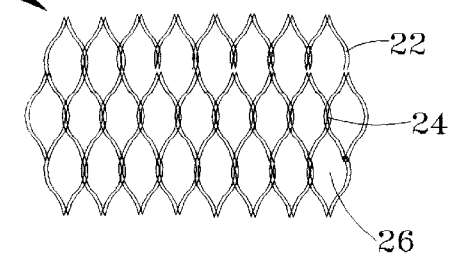
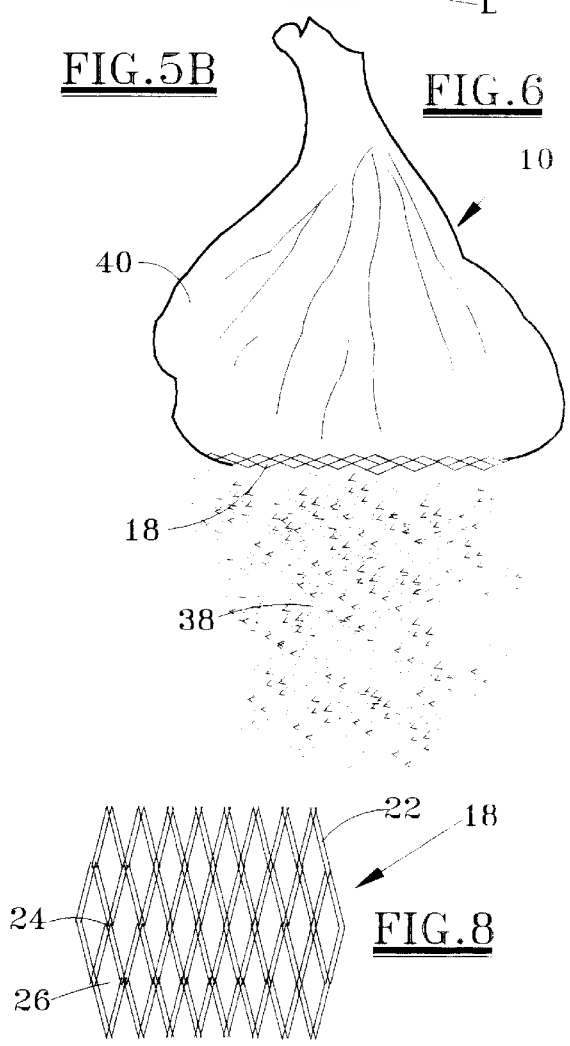
FIG.9     FIG.8

REUSABLE QUICK SIFTER

CROSS REFERENCE TO RELATED APPLICATIONS

This application is a continuation-in-part of U.S. Ser. No. 08/707,051, filed Sep. 3, 1996, now U.S. Pat. No. 5,752,466, which in turn is a continuation-in-part of U.S. Ser. No. 08/522,193 filed Aug. 31, 1995, now U.S. Pat. No. 5,551,376.

FIELD OF THE INVENTION

This invention relates to a method and system for removing waste material from an animal litter box which uses clumping litter.

BACKGROUND OF THE INVENTION

The use of a clumping type of litter in animal litter boxes, such as, for example, cat litter boxes, has desirable features. The clumping of the litter upon contact by liquid waste material such as urine allows the waste material to be easily separated from the uncontaminated litter. Commonly, the clumps of litter and the fecal material in the litter box after use by an animal are removed by scooping the litter with a slotted or perforated spoon to sift the unclumped litter from the waste material. In this manner, the uncontaminated litter can be, at least in theory, kept clean for continued use by the animal. Litter removed with the waste material is generally periodically replaced to maintain a sufficient quantity of litter in the box for use by the animal.

Sifting the litter with the scooping spoon is undesirable. The chore can be time-consuming and often not as effective as desired. For example, if the slots in the spoon are too large, smaller pieces of soiled litter and waste material cannot be separated. Or, if the sifting action is too vigorous, the clumps of litter can be disturbed and broken so that they are not removed from the litter.

Various forms of quick sifters for litter boxes using clumping litter have been proposed. One type of quick sifter in the prior art is made of rigid materials, as in U.S. Pat. No. 4,217,857 to Geddie. Not originally designed for use with clumping litter, this rigid box quick sifter uses a rigid screen pan and two receiving pans that nest or stack together. The litter is cleaned by lifting out the screen pan to sift the litter from the fecal material, placing the screen pan in the unused receiving pan, and pouring in the screened litter to cover the screen. The emptied pan is then nested under the filled receiving pan until the next litter cleaning. However, when the rigid box quick sifter is used with clumping litter, the clumps adhere to the sides and bottom of the screen pan, and in some cases form directly in the grid of the screen. These clumps stuck on or in the screen pan complicate the sifting operation and necessitate cleaning of the screen pan.

Another rigid box quick sifter uses three nested pans with longitudinal spaced-apart slats in the bottom of each pan which are offset from each other by rotating 180 degrees, as in U.S. Pat. No. 5,325,815. These quick sifters have the same problems noted with the Geddie device, but also suffer from urine leakage through the spaces between the slats if the pans are aligned improperly, as when one inadvertently forgets to rotate the bottom pans, or if litter accumulates between the pans and prevents the pans from nesting properly.

Disposable liners having holes formed therethrough in a spaced-apart manner have also been proposed, as in U.S. Pat. No. 5,121,712. These liners still have a number of drawbacks. For example, the holes are usually sized and spaced in a manner which does not allow the unsoiled litter to flow rapidly or completely freely from the sifting liner, with the result that these sifters are not quick enough for the convenience of some consumers. The relatively large perforations through the liner can allow smaller pieces of soiled litter to pass through the liner and contaminate the relatively clean litter. Moreover, these types of sifters are disposable and designed for a single use. Usually made of plastic film, these sifters are not durable.

There remains a need in the art for a reusable quick sifter for use with clumping litter which is economical for everyday use, inhibits passage of urine from the litter box, keeps the side walls of the box clean, is easy to clean and keep aligned for sifting, and quickly and easily effects the sifting operation.

SUMMARY OF THE INVENTION

The present invention provides a reusable quick sifter in the form of a flexible sheet used with a litter box and clumping litter. The sheet has a central opening covered by a netting for sifting the unsoiled litter through the opening. The sheet is preferably made of a piece of rubber-coated fabric large enough to line the litter box. The rubber coating helps the quick sifter keep clumps from sticking to the rubber-coated surface and resist soiling. The quick sifter is washable, preferably machine-washable to facilitate cleaning in the event this becomes necessary or desirable. The reusable quick sifter can be used with a spill guard or hooded enclosure that fits over the litter box to help secure the quick sifter in place and resist misalignment, for example, by clawing or biting by the cats or kittens using the box.

In one aspect, the present invention provides an animal litter box system. The system includes a box having a bottom and a continuous upright wall. A quantity of clumping litter is disposed in the box. At least one flexible liner sheet is disposed under the litter over the bottom of the box and over the upper end of the upright wall. The liner sheet has a central opening and a netting secured to the liner across the central opening to sift unclumped litter therethrough and retain clumped litter thereon when the liner sheet is lifted from the box.

The liner sheet is preferably made of a fabric having a hydrophobic upper surface.

The litter box system preferably uses a top member having a peripheral side wall with a lower end in engagement with the upper end of the upright wall to secure the liner sheet or sheets between the lower and upper ends. The top member can be a spill guard or a hooded enclosure.

Only one liner sheet is needed, but in a preferred embodiment a plurality of the liner sheets can be stacked together over the box.

The litter box system preferably uses a liner sheet with an opening comprising a longitudinal slit in the liner. The netting is preferably secured at parallel seams along each side of the slit. A distance between the parallel seams when the liner is in a relaxed condition in the box is preferably less than a corresponding lay flat width of the netting across the slit. The width of the netting between the seams expands under the weight of the litter when the liner is lifted from the box.

In another aspect, the invention provides a reusable quick sifter for a litter box. The quick sifter has a water-impervious sheet of a size large enough to line a litter box, a longitudinal slit formed in the sheet, and an elongatable netting secured to the sheet across the slit at parallel seams along opposite sides of the slit. A dimension of the unfolded netting between the seams of the liner in a relaxed state is preferably substantially less than a lay flat dimension of the netting between the seams. The sheet is preferably a fabric with a hydrophobic surface, more preferably a woven fabric with a water repellent coating, such as, for example, woven nylon with a rubberized surface.

The sheet of the reusable quick sifter is preferably made from first and second rectangular panels of like length secured together at opposite adjacent corners to form the slit between the panels. The netting can be a rectangular section having longitudinal side edges sewn to the respective rectangular panels to form the parallel seams.

Opposite end edges of the netting can be hemmed together with peripheral edges of the panels.

In a further aspect, the present invention provides a method for removing waste from an animal litter box, comprising the steps of:

(a) placing a reusable quick sifter over a first litter box with a netting disposed in a central area of the box, wherein the quick sifter comprises a water-impervious sheet having a central opening and the netting is secured to the sheet across the central opening to sift unclumped litter therethrough and retain clumped litter thereon;

(b) placing a quantity of clumping litter on the quick sifter in the central area of the box;

(c) allowing an animal to deposit liquid waste in the litter to form clumps;

(d) lifting the quick sifter by outer edges of the sheet to spread open the central opening, laterally expand the netting and substantially enlarge openings in the netting;

(e) sifting unclumped litter through the enlarged openings in the netting and retaining the clumps on the netting;

(f) emptying the clumps from the netting;

(g) relaxing the netting to reduce the size of the openings of the netting; and (h) repeating steps (a) through (g) a plurality of times reusing the quick sifter.

The replacement steps (a) and (b) can be alternated between first and second litter boxes for each successive repetition of the steps (a) through (f). In this embodiment, each successive step (b) includes transferring the sifted litter from the first or second litter box of the last step (d) through (g) to the other first or second litter box of the next steps (a) and (b).

In an alternate embodiment, step (a) includes placing a plurality of the quick sifters over the litter box. Steps (c) through (f) are then repeated using an uppermost quick sifter in each successive step (d) through (f) until the plurality of quick sifters have each been used. Then steps (a) and (b) are repeated to replace the quick sifters and litter.

If desired, the method can include the step of securing the quick sifter in place in the litter box with an upper member. The upper member engages an upper end of the litter box with the quick sifter held in place between the litter box and the upper member. The upper member is preferably a spill guard or hooded enclosure.

The method can also include the step of periodically washing the reusable quick sifter as needed or desired, generally after step (d). The reusable quick sifter is preferably machine-washable.

BRIEF DESCRIPTION OF THE DRAWINGS

FIG. 1 is a plan of a reusable quick sifter according one embodiment of the present invention.

FIG. 2 is a cross-sectional, view partially cut away of the quick sifter of FIG. 1 as seen along the lines 2—2.

FIG. 3 is an enlarged perspective view of the quick sifter of FIG. 1 shown with the netting partially cut away.

FIG. 4 is an enlarged view of the quick sifter of FIG. 1

FIG. 5A is a cross-sectional view of the quick sifter of FIG. 1 as used in a litter box sifting system with a spill guard.

FIG. 5B is a cross-sectional view of the quick sifter of FIG. 1 as used in a litter box sifting system with a hood.

FIG. 6 is a side perspective view of the quick sifter of FIG. 1 wherein unclumped litter is being sifted from the clumped litter and fecal material as the quick sifter is lifted from a litter box.

FIG. 7 is a cross-sectional view of the quick sifter of FIG. 6 showing the litter clumps retained on the netting after completing the sifting operation.

FIG. 8 is a plan view of a preferred netting material shown in a relaxed condition for use in the quick sifter between sifting cycles according to one embodiment of the present invention.

FIG. 9 is a plan view of the netting of FIG. 8 shown in a stretched or expanded condition (but without appreciably elongating any individual filament of the netting), also known or referred to as "lay flat" for dimensional purposes. The netting can be expanded to about its lay flat dimension during the sifting operation.

DETAILED DESCRIPTION OF THE INVENTION

With reference to FIGS. 1–9 wherein like reference numerals indicate like parts, FIG. 1 shows a plan view of a quick sifter 10 according to the present invention. The quick sifter 10 comprises a liquid-impervious liner sheet 12 which is preferably a fabric with at least an upper hydrophobic surface. Desirably, the sheet 12 is a woven fabric for strength and durability, such as 70 to 200 denier nylon or polyester, for example. As seen in FIG. 2, a woven fabric 14 preferably has one or both surfaces rubberized or otherwise coated with a water-repellent coating 16. The rubberized surface 16 resists soiling and helps keep the clumps of litter from sticking to the surface of the sheet 12. The sheet 12 is desirably made of materials so that the sheet 12 is machine washable. If desired, the outer peripheral edge of the sheet 12 is hemmed at 17, for example (see FIGS. 1 and 4), to prevent fraying or other edge deterioration.

The sheet 12 has a mesh or netting 18 secured to an upper surface thereof, i.e. the hydrophobic surface 16, in a central area of the liner sheet 12. The netting 18 is conveniently fused (e.g. thermally or ultrasonically) or sewn along seams 20 to the upper surface of the liner 12. The netting 18 can be any netting having openings wide enough to allow the animal litter to sift therethrough while retaining clumped litter and fecal material thereon. Nylon netting, polypropylene weave or other durable materials are suitable for this purpose. In general, the filaments of the netting are relatively narrow compared to the size of the openings in order to avoid the retention of unclumped litter material between the openings. The use of a netting 18 with relatively wide openings compared to the size of the filaments is essential to facilitate a relatively quick and efficient sifting operation.

A particularly preferred form of netting material is illustrated in FIGS. 8 and 9 which is of the type used to form produce bags for the display of fruits and vegetables, or to package oysters. This material is formed by extrusion of polyethylene filaments 22 which are fused in an alternating manner as at 24 to adjacent filaments to form the mesh material. Square (not shown) or diamond mesh with openings 26 from about 0.125 inch to 0.5 inch are suitable, but the preferred size of openings 26 depends on the type of litter to be used. For most commercially available feline litter of the clumping type, we prefer a diamond mesh with 3/16 inch openings 26. In a preferred embodiment, the netting is in an unstretched or relaxed condition, but not folded, prior to the sifting operation so that the openings 26 are relatively small and the lateral dimension of the netting 18 between the seams 20 is substantially less than the corresponding lay flat width. The weight of the litter on the netting 18 during sifting will readily stretch or expand the netting up to its lay flat width.

A slit 28 is formed in the sheet 12 below the netting 18. As seen in FIG. 1, the slit 28 generally remains relatively narrow or closed in the sheet 12 to inhibit the passage of litter and urine and keep the litter box L from becoming soiled. When the sheet 12 is lifted from a litter box as described in more detail below, the weight of the litter spreads the slit 28 open to allow the unclumped litter to sift through the netting 18. The slit 28 is conveniently formed by providing the sheet 12 in the form of rectangular panels 12a,12b fastened together at adjacent ends 30,32, for example by overlapping and stitching together the adjacent corners of the panels 12a,12b as illustrated in FIGS. 3 and 4. This construction forms the slit 28 between the panels 12a,12b, and stitching 33 provides closures at either end of the slit 28 and secures the ends of the netting 18 to the sheet 12. The manufacturing of the quick sifter 10 can use this construction detail to advantage, for example, by performing the longitudinal stitching 20 and FIG. 1 or hemming 17 continuously on a machine.

To secure the quick sifter 10 in place in litter box L, an upper member can be positioned over the litter box L along a perimeter of upright walls 36 thereof so as to hold the edges of the quick sifter 10, between the upper member and the upright walls 36. In FIG. 5A, the upper member comprises spill guard 34a; in FIG. 5B the upper member is shown as hood 34. Litter 38, preferably of the clumping type, is placed in the litter box L on top of the quick sifter 10 for use by the animal.

When the litter has become soiled by the deposition of the feces and/or urine to form clumps C therein (see FIG. 7), the litter 38 can be sifted by drawing the edges of the quick sifter 10 together to contain the litter 38 as if in a sack or bag 40, and lifting the quick sifter 10 as illustrated in FIGS. 6 and 7. The weight of the litter in the quick sifter 10 forces the slit 28 to separate and the openings 26 in the netting 18 to enlarge as the netting 18 stretches across the slit 28. The unclumped litter falls rapidly through the netting 18, and the urine clumps C are retained by the netting 18 as shown in FIG. 7. Because the quick sifter 10 is flexible, not rigid, and constructed so as to present a water-repellent surface to the clumps C, the clumps C do not tend to soil the quick sifter 10 or stick thereto as sometimes happens with rigid screen/box systems of the prior art. Also, the quick sifter 10 functions as a liner to help keep the surfaces of the litter box L relatively clean and minimize any need to wash the litter box L.

To dispose of the clumps C, the sack 40 is placed in a trash receptacle (not shown) which can be positioned over the litter box L to minimize litter scatter. Then, the quick sifter 10 is lifted at one end or corner and removed from the trash receptacle, and simultaneously the clumps C fall into the trash receptacle. If necessary or desired, the quick sifter 10 can be laundered before replacement in the litter box L.

The quick sifter 10 is replaced in the litter box L by temporarily transferring the clean litter to a storage container. The storage container can be a second litter box L, which can be nested with the first one while not in use in much the same manner as in U.S. Pat. No. 4,217,857 to Geddie. However, any temporary storage container can be used, such as for example, the package in which the litter is shipped. After the quick sifter is positioned in the litter box L, the litter 38 is replaced on top of the quick sifter 10, and any hood 34 or spill guard 34a positioned to hold the quick sifter 10 in place. If desired, a separate or attached (either to the litter box L or to the quick sifter 10 itself) rubber band, clips, straps, hook and loop closures (VELCRO®), or similar fastening devices (not shown) can be used, to hold the quick sifter 10 in place.

It is also possible to use a plurality of the quick sifters 10 stacked together. In this manner, it is possible to avoid the litter transfer step until the last or bottommost quick sifter 10 is lifted from the litter box L. This has the advantage of allowing the used quick sifters 10 to be laundered and dried before replacement and reuse.

Various changes and modifications in the invention will become apparent to those skilled in the art in view of the foregoing disclosure. All such modifications and variations within the scope and spirit of the appended claims are intended to be embraced thereby.

We claim:

1. An animal litter box system, comprising:

a box having a bottom and a continuous upright wall;

a quantity of clumping litter disposed in the box;

at least one flexible liner sheet disposed over the bottom of the box, over an upper end of the upright wall and under the litter;

an opening formed in the liner underlying the litter;

a laterally expandable netting secured at parallel seams along opposite sides of the opening, the netting having a relaxed width between the seams which is substantially less than a corresponding lay flat width of the netting in a laterally expanded condition; and openings in the netting which are relatively small when the netting is in a relaxed condition and relatively large when the netting is laterally expanded between the parallel seams.

2. The litter box system of claim 1, wherein the at least one liner sheet is made of a fabric having a hydrophobic upper surface.

3. The litter box system of claim 1, further comprising a top member having a peripheral side wall with a lower end in engagement with the upper end of the upright wall to secure the at least one liner sheet between the lower and upper ends.

4. The litter box system of claim 3, wherein the top member comprises a spill guard.

5. The litter box system of claim 3, wherein the top member comprises a hooded enclosure.

6. The litter box system of claim 1, comprising a plurality of liner sheets stacked together over the box.

7. A reusable quick sifter for a litter box, comprising:

a water-impervious sheet of a size large enough to line a litter box;

a longitudinal slit formed in the sheet;

a laterally expandable netting secured to the sheet across the slit at parallel seams along opposite sides of the slit, wherein a dimension of the unfolded netting between the seams of the sheet in a relaxed state is substantially less than a corresponding lay flat dimension of the laterally expanded netting between the seams.

8. The reusable quick sifter of claim 7, wherein the sheet comprises a fabric with a hydrophobic surface.

9. The reusable quick sifter of claim 7, wherein the sheet comprises a woven fabric with a water repellent coating.

10. The reusable quick sifter of claim 7, wherein the sheet comprises woven nylon with a rubberized surface.

11. The reusable quick sifter of claim 7, wherein the sheet comprises first and second rectangular panels of like length secured together at opposite adjacent corners to form the slit between the panels.

12. The reusable quick sifter of claim 11, wherein the netting comprises a rectangular section having longitudinal side edges sewn to the respective rectangular panels to form the parallel seams.

13. The reusable quick sifter of claim 12, wherein opposite end edges of the netting are hemmed with peripheral edges of the panels.

14. A method for removing waste from an animal litter box, comprising the steps of:
 (a) placing a reusable quick sifter over a first litter box with a laterally expandable netting disposed in a central area of the box, wherein the quick sifter comprises a water-impervious sheet having a central opening and the netting is secured to the sheet across the central opening for sifting unclumped litter therethrough and retaining clumped litter thereon;
 (b) placing a quantity of clumping litter on the quick sifter in the central area of the box;
 (c) allowing an animal to deposit liquid waste in the litter to form clumps;
 (d) lifting the quick sifter by outer edges of the sheet to spread open the central opening, laterally expand the netting and substantially enlarge openings in the netting;
 (e) sifting unclumped litter through the enlarged openings in the netting and retaining the clumps on the netting;
 (f) emptying the clumps from the netting;
 (g) relaxing the netting to reduce the size of the openings in the netting; and
 repeating steps (a) through (g) a plurality of times reusing the quick sifter.

15. The method of claim 14, wherein the replacement steps (a) and (b) are alternated between first and second litter boxes for each successive repetition of said steps (a) through (e), wherein each successive step (b) includes transferring the sifted litter from the first or second litter box from the previous step (e) to the other second or first respective litter box.

16. The method of claim 14, wherein the step (a) includes placing a plurality of the quick sifters over the litter box, and further comprising repeating steps (c) through (f) using an uppermost quick sifter in each successive step (d) through (f) until the plurality of quick sifters have each been used before said repetition of steps (a) and (b).

17. The method of claim 14, including the step of securing the quick sifter in place in the litter box with a spill guard or hooded enclosure that engages an upper end of the litter box with the quick sifter held in place between the litter box and the spill guard or hooded enclosure.

18. The method of claim 14, including the step of periodically washing the reusable quick sifter.

19. The method of claim 18, wherein the reusable quick sifter is machine-washable.

* * * * *